United States Patent
Chang et al.

(10) Patent No.: US 11,618,415 B1
(45) Date of Patent: Apr. 4, 2023

(54) WIPER ASSEMBLING STRUCTURE

(71) Applicant: DANYANG UPC AUTO PARTS CO., LTD., Jiangsu (CN)

(72) Inventors: Che-Wei Chang, Jiangsu (CN); Cheng-Kai Yang, Jiangsu (CN)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 17/575,618

(22) Filed: Jan. 13, 2022

(51) Int. Cl.
*B60S 1/38* (2006.01)
*B60S 1/40* (2006.01)

(52) U.S. Cl.
CPC ............. *B60S 1/38* (2013.01); *B60S 1/3848* (2013.01); *B60S 1/3849* (2013.01); *B60S 1/3867* (2013.01); *B60S 1/4045* (2013.01)

(58) Field of Classification Search
CPC .... B60S 1/3849; B60S 1/3865; B60S 1/3867; B60S 1/387; B60S 1/3851; B60S 1/3848; B60S 1/40
USPC ............. 15/250.32, 250.43, 250.44, 250.201
See application file for complete search history.

(56) References Cited

U.S. PATENT DOCUMENTS

2010/0024151 A1* 2/2010 Ku ........................ B60S 1/381
15/250.351
2018/0086311 A1* 3/2018 Luo ....................... B60S 1/3858
2020/0062221 A1* 2/2020 Tolentino ............... B60S 1/0491
2022/0001840 A1 1/2022 Tolentino et al.

FOREIGN PATENT DOCUMENTS

| DE | 10349637 A1 | 6/2005 |
| DE | 202012006467 | * 9/2012 |
| EP | 1837259 | * 9/2007 |
| EP | 2436567 | * 4/2012 |

OTHER PUBLICATIONS

Search Report dated Jun. 24, 2022 of the corresponding European patent application No. 22151637.0.

* cited by examiner

*Primary Examiner* — Gary K. Graham
(74) *Attorney, Agent, or Firm* — Chun-Ming Shih; HDLS IPR Services

(57) ABSTRACT

The disclosure relates to a wiper assembling structure, which includes a fixing seat, an accessory seat, and a blade set. The fixing seat includes a shell seat and multiple pressing blocks disposed in the shell seat. The accessory seat includes a bottom plate and two side plates perpendicularly extended from the bottom plate. Each of two ends of each side plate is formed with multiple protrusive sheets. The accessory seat is positioned in the fixing seat by inserting the protrusive sheets into the shell seat to be pressed by the pressing blocks. The blade set includes an elastic sheet and a rubber strip. The elastic sheet is disposed under the bottom plate. The rubber strip is connected with the elastic sheet and extended on one side of the accessory seat.

7 Claims, 6 Drawing Sheets

WIPER ASSEMBLING STRUCTURE

BACKGROUND

Technical Field

The disclosure relates to a windshield wiper structure, particularly to an assembling structure of a windshield wiper.

Related Art

A car wiper is disposed outside the glass and connected to a wiper driving arm. The wiper is driven by the driving arm to swing over the glass to remove rain, snow, and/or dirt.

Also, a wiper structure generally includes an accessory seat, a fixing seat, and a protective cover. The bottom of the accessory seat is connected with a rubber blade. The fixing seat is connected on the accessory seat. The protective cover is installed atop the fixing seat. As a result, the wiper driving arm is fixed to the accessory seat to drive the accessory and press the blade so as to accomplish the function of cleaning glass.

Furthermore, the fixing seat of the abovementioned wiper structure is connected to the accessory seat by a pivot or a rotary engagement. However, the assembling process of such a pivoting connection is complicated and causes high manufacturing costs. In addition, the assembling process of such a rotary engagement tends to cause separation during swinging. This results in danger and inconvenience.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

The disclosure provides a wiper assembling structure, which may simplify assembling of a wiper structure and stabilize the connection between the fixing seat and the accessory seat.

To accomplish the above object, the disclosure provides a wiper assembling structure, which includes a fixing seat, an accessory seat, and a blade set. The fixing seat includes a shell seat and multiple pressing blocks disposed in the shell seat. The accessory seat includes a bottom plate and two side plates perpendicularly extended from the bottom plate. Ends of the side plates are formed with multiple protrusive sheets. The accessory seat is positioned in the fixing seat by inserting the protrusive sheets into the shell seat to be pressed by the pressing blocks. The blade set includes an elastic sheet and a rubber strip. The elastic sheet is disposed under the bottom plate. The rubber strip is connected with the elastic sheet and extended on one side of the accessory seat.

In comparison with the related art, the wiper assembling structure of the disclosure is disposed with multiple pressing blocks on the fixing seat and formed with multiple protrusive sheets on the ends of the side plates of the accessory seat, so that the accessory seat is assembled in the fixing seat by inserting the protrusive sheets into the shell seat to be pressed by the pressing blocks, and the accessory seat is not easily being separate from the fixing seat due to the interference fit to accomplish the object of firm connection. In addition, the shell seat is formed with multiple fastening sheets on a periphery of the fixing seat, the two side plates are disposed with multiple fastening holes corresponding to positions of the fastening sheets so that the fastening sheets are engaged with the fastening holes to accomplish the objects of simplification of the wiper structure and firm connection.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
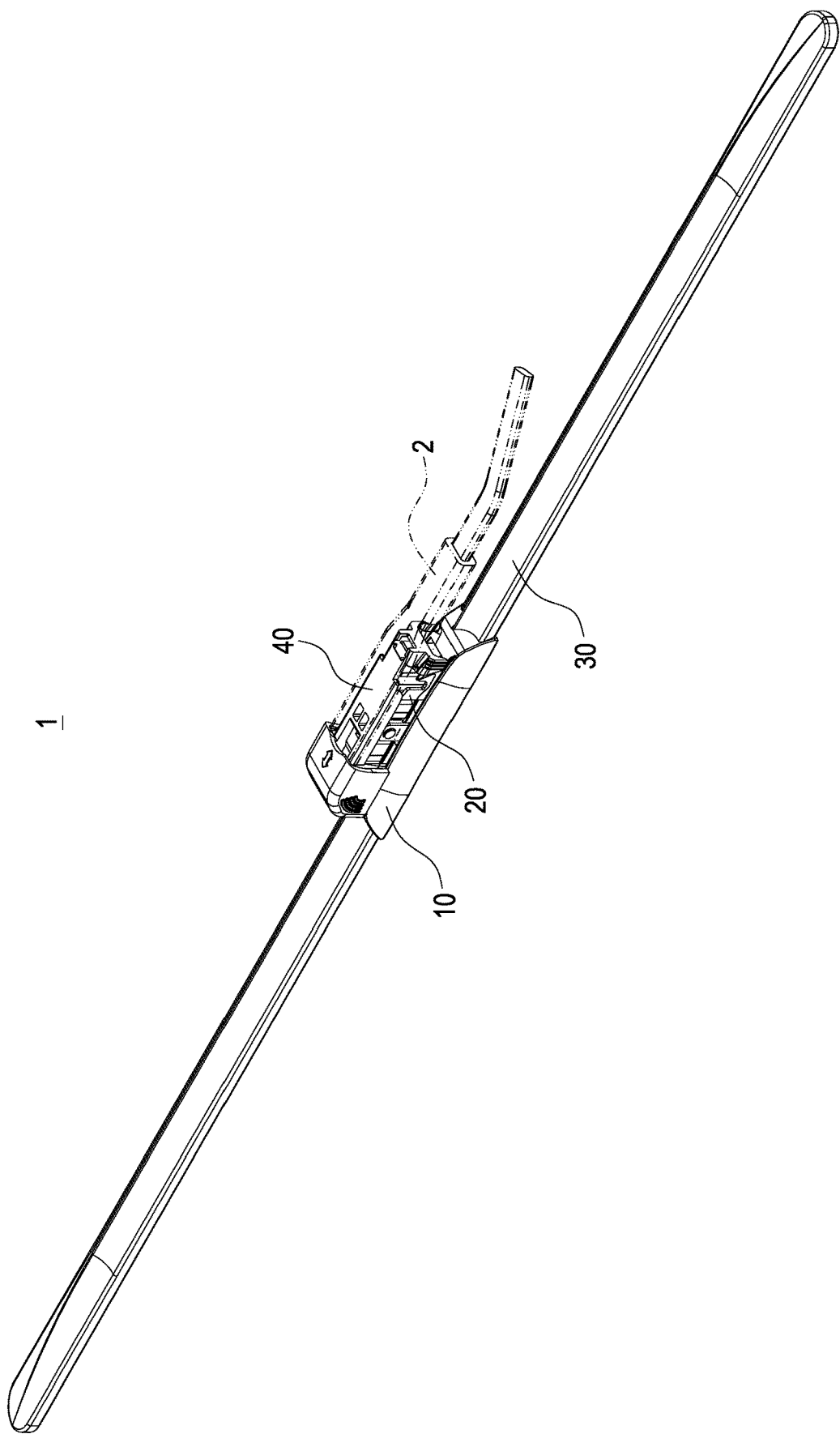
FIG. 1 is a perspective schematic view of the wiper assembling structure of the disclosure.
Figure 2:
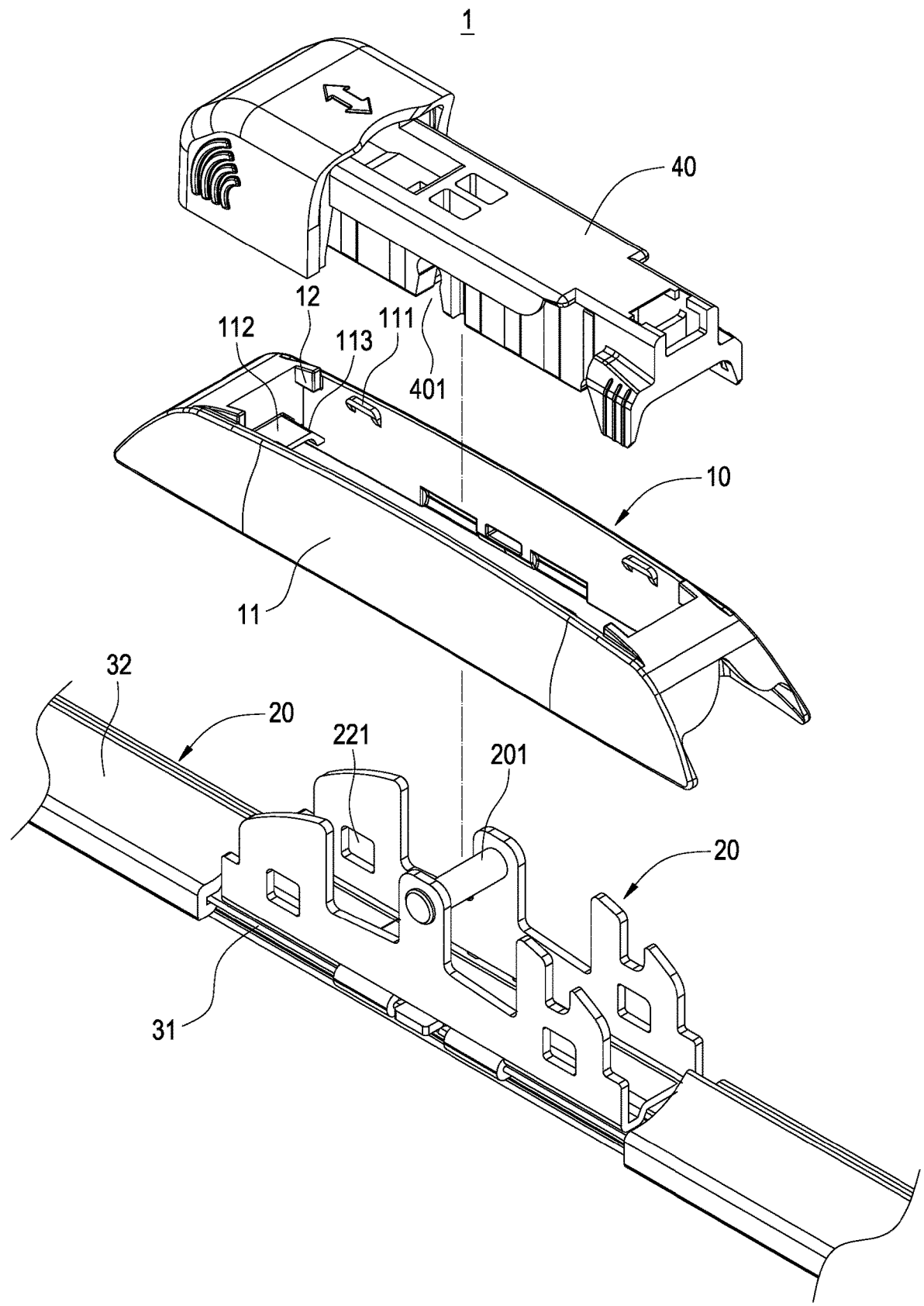
FIG. 2 is an exploded view of the wiper assembling structure of the disclosure.

Please refer to FIGS. 1 and 2, which are a perspective schematic view and an exploded view of the wiper assembling structure of the disclosure. The disclosure provides a wiper assembling structure 1 to be connected with a driving arm 2. The wiper assembling structure 1 includes a fixing seat 10, an accessory seat 20, a blade set 30 and a protective cover 40. The accessory seat 20 is connected in the fixing seat 10 by means of interference fit. The blade set 30 is connected on the bottom of the accessory seat 20. In the embodiment, the accessory seat 20 is disposed with a pivot 201. Also, the protective cover 40 is disposed with a through hole 401. The protective cover 40 is connected to the accessory seat 20 by passing the pivot 201 through the through hole 401 so as to complete the wiper assembling structure 1. More details will be described below.

Please refer to FIGS. 3-6, which are an exploded view of the fixing seat and the accessory seat, a perspective schematic view of the wiper assembling structure after removing the protective cover and two assembled cross-sectional views of the wiper assembling structure of the disclosure after removing the protective cover. In an embodiment of the disclosure, the fixing seat 10 includes a shell seat 11 and multiple pressing blocks 12 disposed in the shell seat 11. The accessory seat 20 includes a bottom plate 21 and two side plates 22 perpendicularly extended from the bottom plate 21. Each of two ends of each side plate is formed with multiple protrusive sheets 23. The accessory seat 20 is positioned in the fixing seat 10 by inserting the protrusive sheets 23 into the shell seat 11 to be pressed by the pressing blocks 12.

Further, the blade set 30 includes an elastic sheet 31 and a rubber strip 32. The elastic sheet 31 is disposed under the bottom plate 21. The rubber strip 32 is connected with the elastic sheet 31 and extended on one side of the accessory seat 20. In some embodiments, the blade set 30 includes two rubber strips 32 extended oppositely on two sides of the accessory seat 20.

In detail, the shell seat 11 has an opening 100. The shell seat 11 is formed with a receiving trough 110 at the position of the opening 100 and corresponding to the two side plates 22 of the accessory seat 20. The shell seat 11 is formed with the pressing blocks 12 at corners of the receiving trough 110 (the opening 100). In addition, the accessory seat 20 includes the pivot 201 disposed between the two side plates 22. Each of the two side plates 22 is disposed with two indents 220 at two sides of the pivot 201. The indent 220 may be used for connecting with different driving arms 2 to increase utility.

In some embodiments, the shell seat 11 is formed with multiple fastening sheets 111 on a periphery of the receiving trough 110. The fastening sheets 111 are adjacent to the opening 100. In addition, the two side plates 22 are disposed with multiple fastening holes 221 corresponding to positions of the fastening sheets 111. The fastening sheets 111 are engaged with the fastening holes 221 to make the accessory seat 20 be connected in the fixing seat 10 more firmly.

Figure 3:
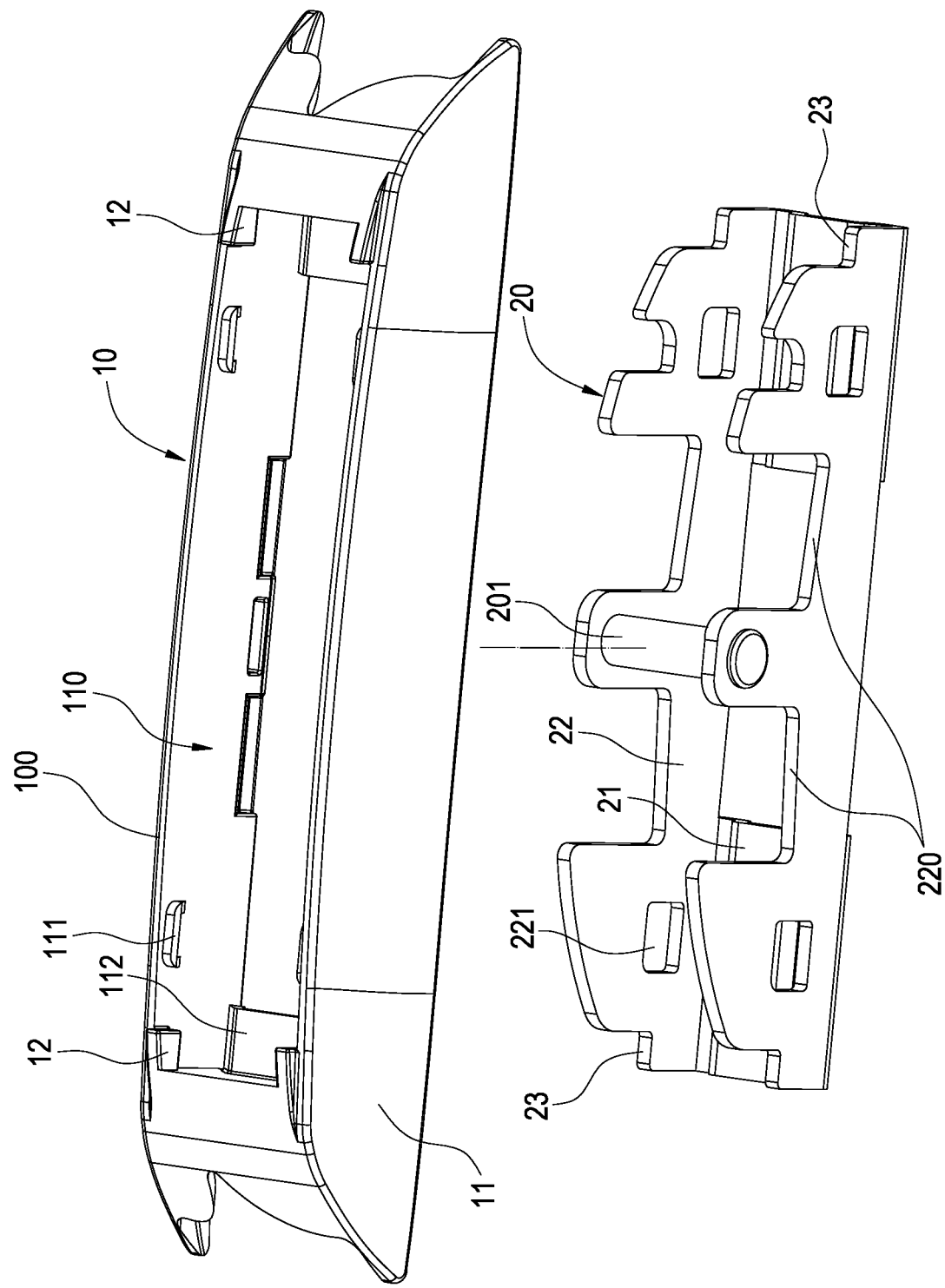
FIG. 3 is an exploded view of the fixing seat and the accessory seat of the disclosure.
Figure 4:
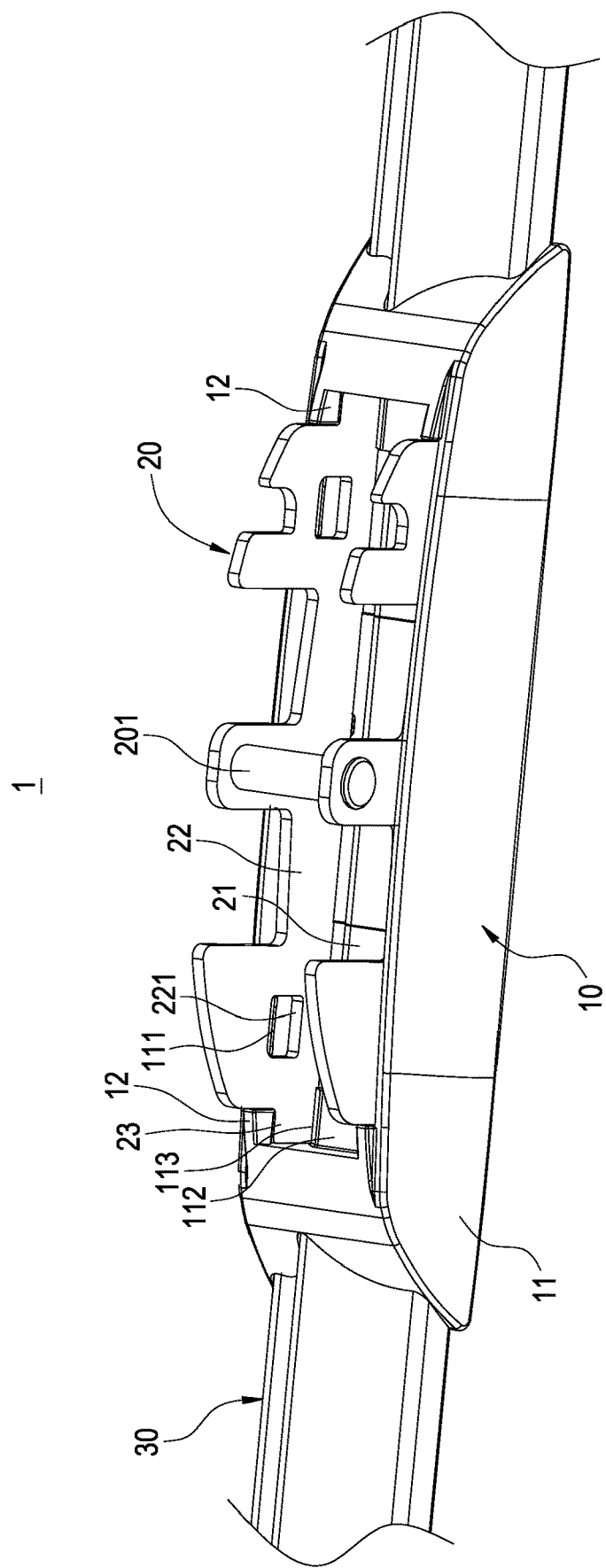
FIG. 4 is a perspective schematic view of the wiper assembling structure of the disclosure after removing the protective cover.
Figure 5:
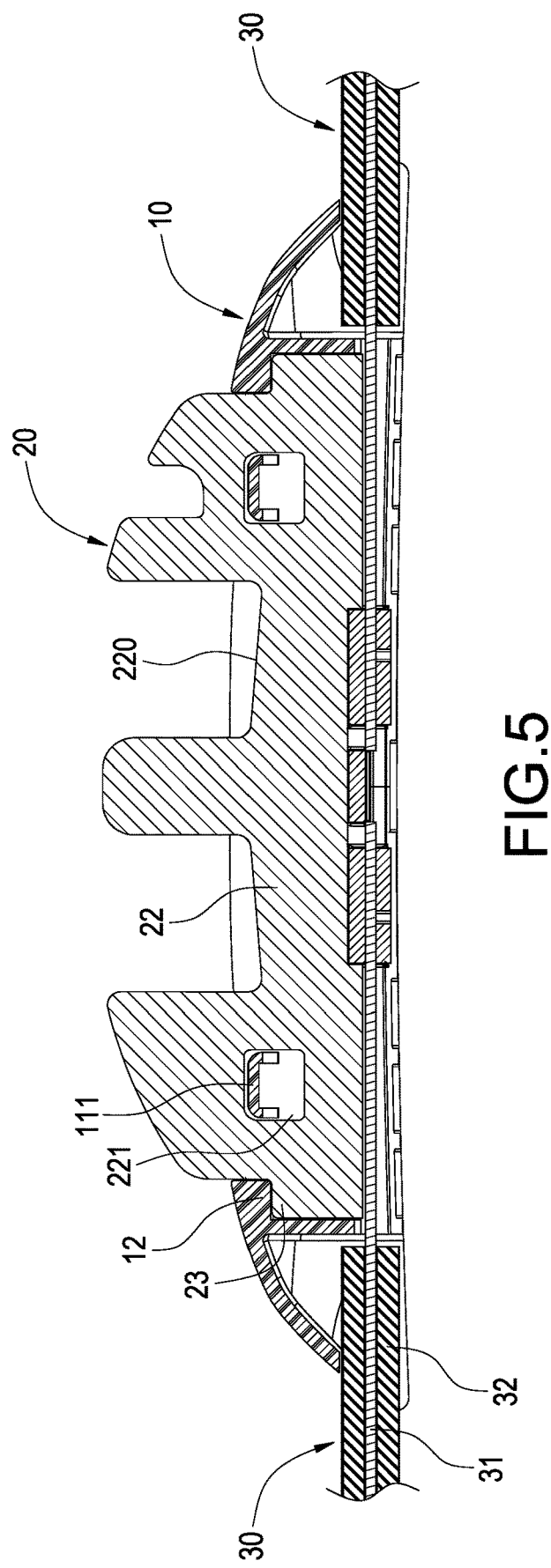
FIGS. 5 and 6 are assembled cross-sectional views of the wiper assembling structure of the disclosure after removing the protective cover.

In detail, the shell seat 11 is formed with multiple support sheets 112 on the bottom of the receiving trough 110. Also, two ends of the bottom plate 21 abut against the support sheets 112. In addition, the support sheets 112 are disposed separately corresponding to the pressing blocks 12 in position. The protrusive sheets 23 are inserted between the support sheets 112 and the pressing blocks 12 as shown in FIG. 3, respectively.

In an embodiment of the disclosure, the shell seat 11 is disposed with a groove 113 on two sides of each support sheet 112 as shown in FIG. 2. Each protrusive sheet 23 is inserted between the groove 113 and the pressing block 12 as shown in FIGS. 2 and 3.

Figure 6:
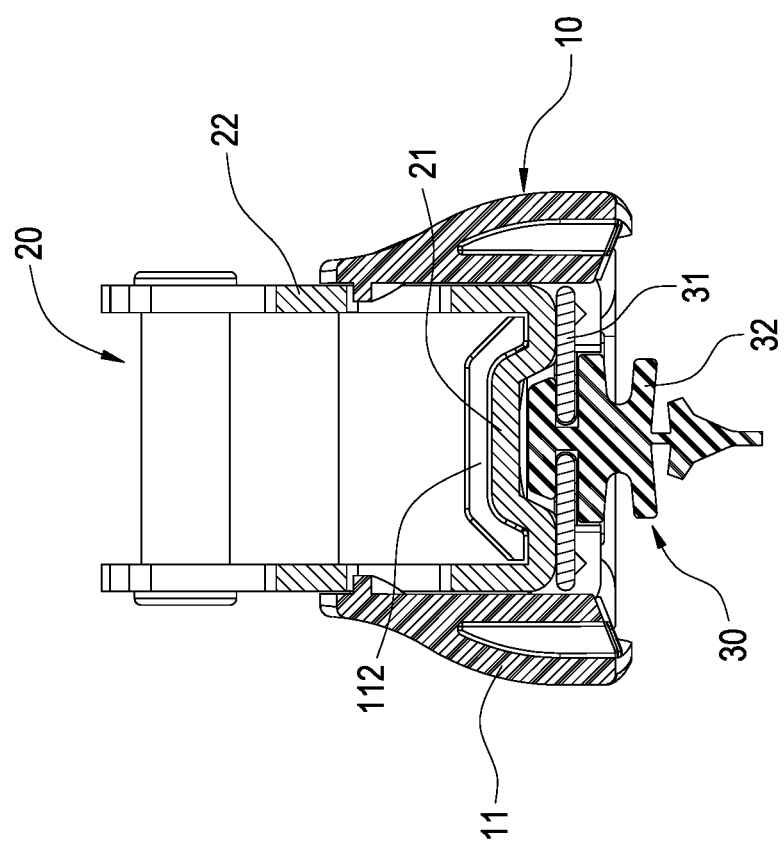

It is noted that a cross-section of the bottom plate 21 is corresponding to a cross-section of the support sheet 112 to be a U-shape as shown in FIG. 6. Thus, the bottom plate 21 and the support sheet 112 may indeed abut against each other to make the both connect more firmly.

It is also noted that when the accessory seat 20 of the disclosure is being assembled in the fixing seat 10, the protrusive sheet 23 on a side of the accessory seat 20 is placed in the pressing block 12 on one side of the shell seat 11 first to be placed in the receiving trough 112, and then the protrusive sheet 23 on the other side of the accessory seat 20 is pressed to be under the pressing block 12 on the other side. As a result, the accessory seat 20 is assembled in the fixing seat 10 by means of interference fit to make the accessory seat 20 be unable to be separated from the fixing seat 10.

While this disclosure has been described by means of specific embodiments, numerous modifications and variations could be made thereto by those skilled in the art without departing from the scope and spirit of this disclosure set forth in the claims.

What is claimed is:

1. A wiper assembling structure connected with a driving arm, the wiper assembling structure comprising:
   a fixing seat, comprising a shell seat and multiple pressing blocks disposed in the shell seat;
   an accessory seat, comprising a bottom plate and two side plates perpendicularly extended from the bottom plate, each of two ends of each side plates comprising multiple protrusive sheets respectively disposed on an end thereof, and the accessory seat positioned in the fixing seat by inserting the protrusive sheets into the shell seat to be pressed by the pressing blocks; and
   a blade set, comprising an elastic sheet and at least one rubber strip, the elastic sheet disposed under the bottom plate, and the rubber strip connected with the elastic sheet and extended on one side of the accessory seat,
   wherein the shell seat comprises a receiving trough disposed corresponding to the two side plates of the accessory seat, and the pressing blocks are disposed on corners of the receiving trough of the shell seat,
   wherein the shell seat comprises multiple support sheets disposed on a bottom of the receiving trough, and two ends of the bottom plate abut against the support sheets.

2. The wiper assembling structure of claim 1, wherein the shell seat comprises multiple fastening sheets disposed on a periphery of the receiving trough, the two side plates comprises multiple fastening holes disposed corresponding to the fastening sheets, and the fastening sheets are engaged with the fastening holes.

3. The wiper assembling structure of claim 1, wherein the support sheets are separately disposed corresponding to the pressing blocks in position, and the protrusive sheets are inserted between the support sheets and the pressing blocks, respectively.

4. The wiper assembling structure of claim 3, wherein the shell seat comprises a groove disposed on two sides of each support sheet, and each protrusive sheet is inserted between the groove and the pressing block.

5. The wiper assembling structure of claim 4, wherein a cross-section of the bottom plate is configured corresponding to a cross-section of the support sheet, and the cross-section of the bottom plate is a U-shape.

6. The wiper assembling structure of claim 1, wherein the accessory seat further comprises a pivot disposed between the two side plates, and each of the two side plates comprises two indents disposed on two sides of the pivot.

7. The wiper assembling structure of claim 6, further comprising a protective cover, wherein the protective cover comprises a through hole, and the protective cover is connected to the accessory seat by passing the pivot through the through hole.

* * * * *